July 12, 1938.  F. T. COURT  2,123,405
COTTON CLEANER
Filed April 23, 1934   5 Sheets-Sheet 4
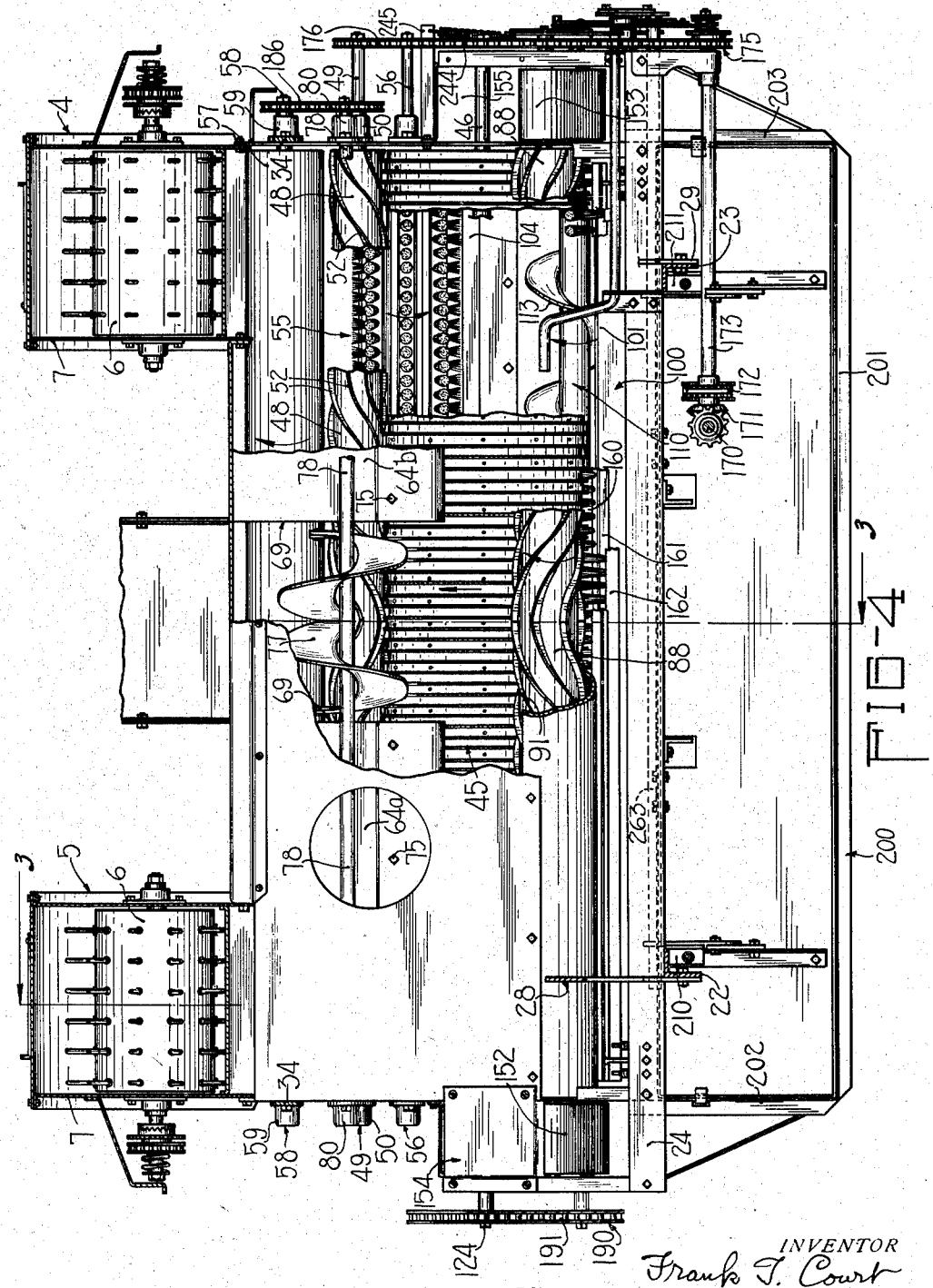
INVENTOR
Frank T. Court
BY Brown, Jackson, Boettcher & Dienner
ATTORNEYS.
WITNESS
Walter Ackerman

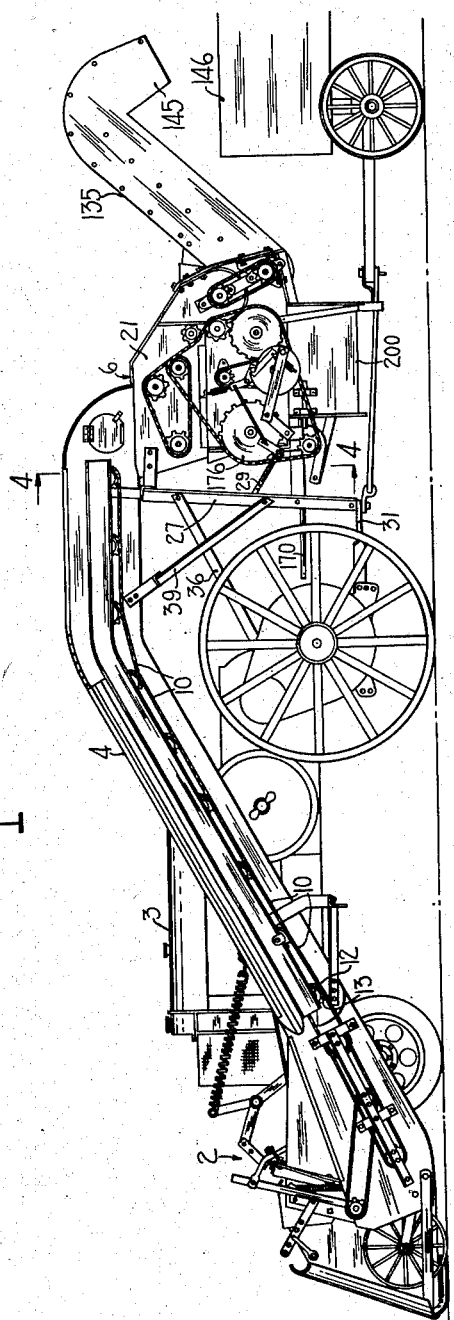

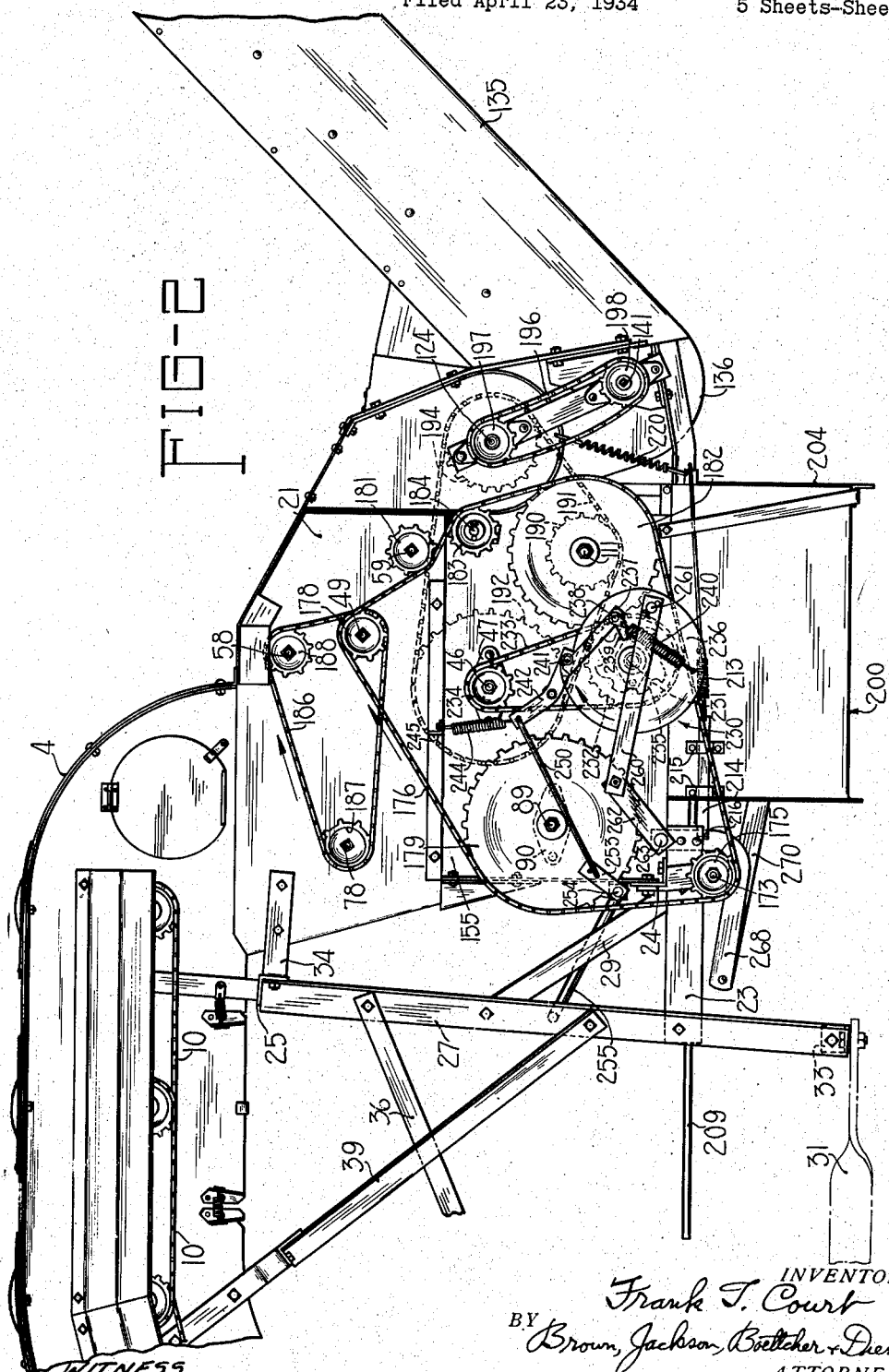

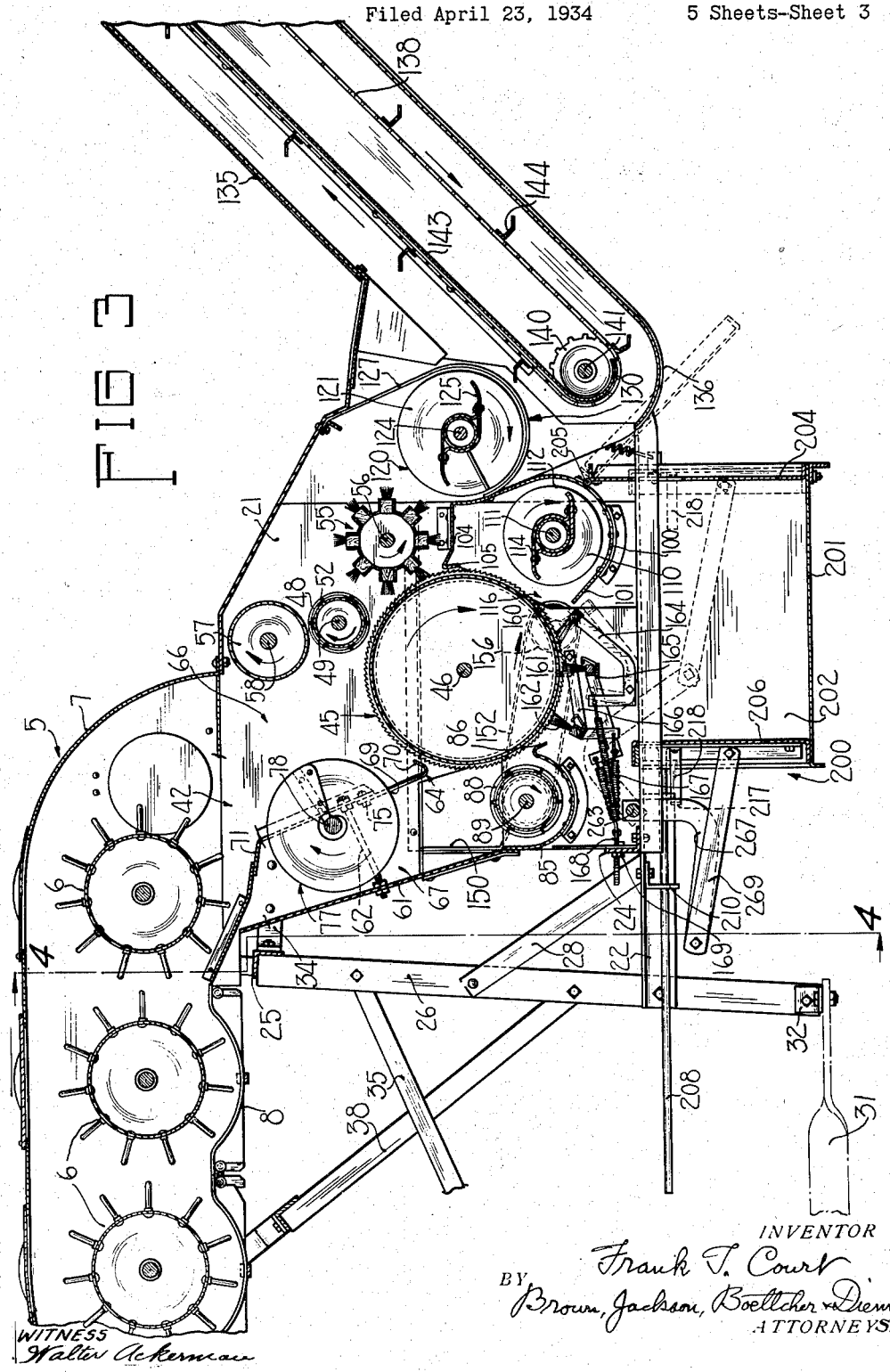

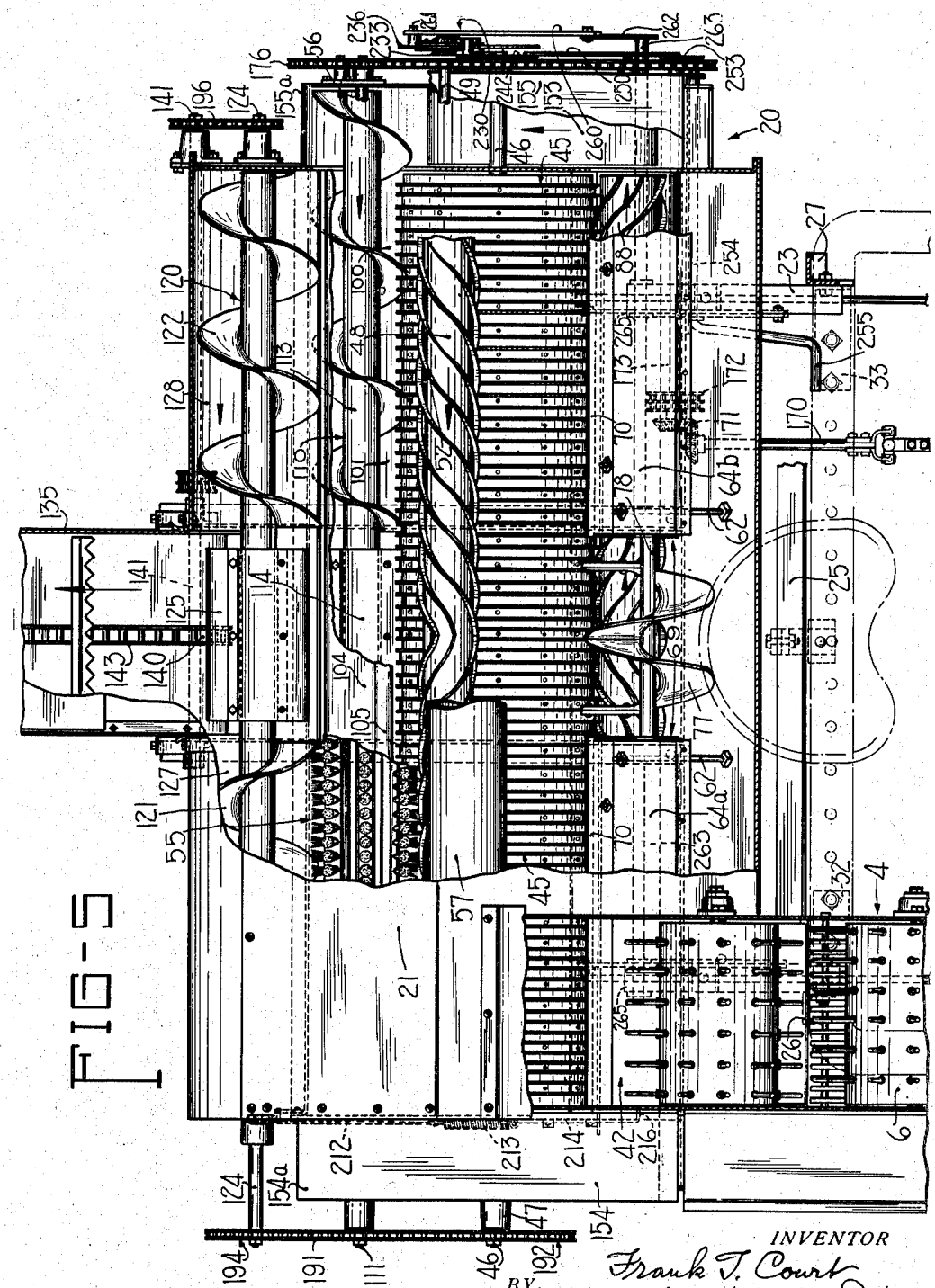

Patented July 12, 1938

2,123,405

UNITED STATES PATENT OFFICE 2,123,405

COTTON CLEANER

Frank T. Court, Moline, Ill., assignor to Deere & Company, Moline, Ill., a corporation of Illinois Application April 23, 1934, Serial No. 721,962

18 Claims. (Cl. 19—37)

The present invention relates generally to agricultural implements, more particularly to cotton harvesting machines, and has for its principal object the provision of a cotton harvesting machine having improved cleaning means. According to the principles of the present invention, the cleaning mechanism includes a rotatable toothed saw cylinder for picking up the cotton lint, and the stripped material is presented to the saw cylinder at a plurality of points around its circumference in succession whereby, not only has the capacity of the cleaner been increased but, in addition, the cleaner does a much more thorough job. Presenting the cotton in this manner materially increases the efficiency of the machine, because not only is the ripened cotton separated from any foreign material, such as twigs, dirt and the like, but also the ripened cotton is separated from the green and unopened bolls. In this connection, the present invention is an improvement upon the machine disclosed and claimed in the patent to Frederick A. Thomann, No. 2,064,394, issued December 15, 1936.

Still further, another object of the present invention is the provision of new and improved cleaning and separating means by which, in the first place, the green material, including the green and immatured cotton bolls, is separated from the ripened bolls and, in the second place, only the matured portions of the crop are presented to the saw cylinder at a plurality of points around its circumference.

An additional object of the present invention is the provision of a hopper for receiving cotton and the like and which is provided with a plurality of sections into each of which sections the saw cylinder, or at least a portion thereof, is disposed, in connection with means for feeding or conducting the cotton into each section in succession. Still further another object of the present invention is the provision of means in each section which, by virtue of its rotation, serves to direct the cotton or other material in the section toward the periphery of the separating cylinder.

A further object of the present invention is the provision of a multi-sectioned hopper, in each section of which means is disposed for not only directing the material toward the separating cylinder but, in addition, for advancing the material axially along the cylinder.

An additional object of the present invention is the provision of cleaning means in which cotton is automatically shifted axially of the main saw cylinder first in one direction and then in the other throughout a plurality of cycles, whereby the saw cylinder is loaded uniformly, thereby further improving the efficiency of the cleaning mechanism.

Still further, another object of the present invention is the provision of simple and efficient mechanism for transferring the cotton from one point of the saw cylinder to other points thereof, whereby the cotton is presented to the saw cylinder at a plurality of points in succession.

Another object of the present invention in this connection is the provision of a machine which, with a simple adjustment, can be arranged to operate either as a machine to break open all the bolls, as in operating in fields where the whole crop is ripe, or as a machine to strip the plants and separate the green portions of the crop from the ripe portions without injuring the green bolls.

An additional object of the present invention is the provision of cleaning means for a cotton harvester and the like which embodies a saw cylinder provided with or arranged in association with means for presenting the cotton and other stripped material to the cylinder at a plurality of points, in connection with means arranged in one position of adjustment to remove foreign matter clinging to the cotton on the separating cylinder, which last named means, in another position of adjustment, provides for the discharge of unopened or green bolls from the separating means.

Another object of the present invention is the provision of improved beater means for cotton cleaning mechanism. Most cotton cleaning and separating mechanism embodies a toothed device for picking up the loose and opened cotton and a doffing device, usually in the form of a brush or the like rotating at a greater speed than the toothed member, for doffing the cotton from the toothed member. Also, the usual construction embodies a rotatable member or beater for keeping back any foreign material clinging to the cotton. According to the present invention, my improved beater means includes a pair of rotatable elements one of which rotates in conjunction with the toothed member, but in a peripheral direction opposite thereto for brushing back foreign material, and another rotatable element rotating in a peripheral direction opposite to the rotation of said first beater, for brushing back any material tending to cling to the first beater.

In this connection, it is another object of the present invention to construct the second beater in the form of a smooth cylinder or the like.

These and other objects and advantages of the present invention will be apparent to those skilled in the art after a consideration of the following detailed description of the preferred construction, taken in conjunction with the accompanying drawings illustrating such construction.

In the drawings:

Figure 1 is a side view of a tractor-mounted cotton harvester embodying the principles of the present invention;

Figure 2 is a side view showing the power connections to the various cylinders, drums and conveyors of the cleaner;

Figure 3 is a cross-sectional view taken along the line 3—3 of Figure 4;

Figure 4 is an end view looking away from the tractor rearwardly along the lines 4—4 of Figures 1 and 3, with certain parts cut away for better illustration; and Figure 5 is a top view of the cleaner with the left hand conveyor-cleaner omitted and other parts broken away for better illustration.

Referring now to Figure 1, the harvester illustrated is a tractor mounted two-row cotton stripper comprising a pair of stripping mechanisms 2, disposed on opposite sides of a tractor 3 and adjacent the front end thereof, which deposit the material stripped from the plants into preliminary cleaner conveyors 4 and 5 disposed along opposite sides of the tractor and which deposit into a final cleaner mounted at the rear of the tractor. The present invention is not particularly concerned with the construction of the stripping mechanisms or the construction of the preliminary cleaner conveyors, but from Figures 2, 3, and 4, it will be noted that the preliminary conveying and cleaning units 4 and 5 include a plurality of beaters 6 disposed within a housing 7 having an open work bottom 8 formed of screen material, spaced rods or the like and curved to conform to the beaters 6 and arranged to permit foreign matter to drop through to the ground. The beaters 6 are suitably connected by a plurality of chains 10 so as to be driven together and rotated in the same direction by any suitable means. Preferably, however, the beaters 6 are all driven from a forward drive shaft 12 best shown in Figure 1 and arranged to drive the chains 10 by means of a drive sprocket 13 which is detachable from the drive shaft 12 and may be replaced by a similar sprocket of different size so as to provide for driving the beaters 6 at the proper speed according to operating conditions, and more particularly to adapt the machine for operating either in fields where all of the crop is ripe or in fields where an appreciable portion of the crop consists of green and immature bolls. The shaft 12 is preferably driven from the power takeoff of the tractor.

When operating in crops in which all of the cotton is matured the drive sprocket 13 for each of the preliminary cleaners and conveyors 4 and 5 is of relatively large size so that the beaters will have relatively high velocity whereby all of the bolls are broken open and foreign matter, such as small sticks, burrs and the like, are discharged through the openwork bottom 8. However, when the machine is to be operated in green cotton, it is essential that the green bolls will not be injured during this preliminary cleaning operation, and, to this end, a drive sprocket 13 for each of the preliminary cleaners and conveyors is provided which is of such size that the speed of the beaters is not great enough to break or injure the green bolls.

The cleaning mechanism is carried at the rear of the tractor and its detailed construction is in the nature of an improvement upon the cleaning means disclosed and claimed in my copending application, Serial No. 530,452, filed April 16, 1931. The cleaning mechanism of the present invention includes a housing 21 supported on a pair of longitudinally disposed angle iron members 22 and 23, best shown in Figures 2 and 3, and transverse angle iron members 24 and 25, best shown in Figures 3 and 4. The transverse members 24 and 25 extend entirely across the rear of the tractor, as best shown in Figure 4, and the member 24 is carried upon the longitudinal bars 22 and 23. The transverse angle member 25 is connected at its ends with vertical angle iron supports 26 and 27, and the lower ends of the latter are connected, respectively, with the forward ends of the longitudinal members 22 and 23, these members being braced by diagonal frame pieces 28 and 29. These parts constitute the main supporting frame work for the cleaning mechanism, and the principal portion of the weight thereof is carried upon the draw bar 31 of the tractor, the lower ends of the vertical members 26 and 27 bearing directly thereon and secured thereto by any suitable means such as clips 32 and 33. The upper part of the housing 21 is attached to the upper transverse bar 25 by brackets 34. The cleaner framework also includes diagonal braces 35 and 36 connected at their rear ends to the vertical bars 26 and 27 and extending forwardly and downwardly to any suitable point of attachment to the tractor 3, as best shown in Figure 1. Diagonal braces 38 and 39 are also provided and are secured at their rear ends to the lower portions of the vertical bars 26 and 27 and to the rear ends of the preliminary cleaner and conveyor housings 4 and 5.

The upper or top wall of the cleaner housing 21 is provided with a pair of laterally spaced openings 42 adjacent the ends thereof, as best shown in Figures 3 and 5, and the discharge ends of the preliminary cleaner and conveyors 4 and 5 are disposed over these openings so as to discharge the stripped material into the cleaner housing 21 adjacent the ends thereof. A main saw cylinder 45 is rotatably mounted in approximately the central portion of the housing and is carried upon a shaft 46 carried in any suitable form of bearing means 47 (see Figures 2 and 5) fastened to the side walls of the housing 21 so as to dispose the main saw cylinder 45 in a generally transverse position underneath the discharge openings 42. A drum 48 is disposed above the saw cylinder, as best shown in Figure 3, and is carried upon a shaft 49 supported in any suitable way, as by bearings 50 (Figure 4), in the housing 21. The drum 48 is provided with spiral ridges 52 which are of the form best shown in Figure 5 and which are permanently secured to the drum 48. A rotatable doffing drum or brush 55 is carried upon a shaft 56 and is disposed rearwardly of the drum 48. A smooth drum 57 is disposed above the spiral drum 52 and cooperates with the latter in preventing material from being carried over the top of the drum 52. The smooth drum 57 is rotatably supported in the housing 21 by a shaft 58 supported by bearing means 59, as best shown in Figure 4.

The front wall of the cleaner housing 21 is indicated by the reference numeral 61, and this wall supports, as by stay bolts 62, an inner wall 64 (Fig. 3) which divides this portion of the cleaner housing into two chambers indicated, respectively, by the reference numerals 66 and 67. The inner wall 64 extends transversely the entire length of the cleaner housing 21 but is interrupted at its central portion to provide two separated sections 64a and 64b (see Figure 5) the laterally inner ends of which are spaced apart to form thereby an opening 69 which affords a communication between the chamber 66 and the chamber 67. As best shown in Figure 3, the lowermost edges of the wall sections 64a and 64b are formed to lie closely adjacent the periphery of the saw cylinder 45, as indicated by the reference numeral 70 in Figure 3. The upper edges 71 of the intermediate wall means 64 are turned forwardly and are engaged by portions of the preliminary cleaner and conveyor housings in the manner best shown in Figure 3 so that all material directed into the cleaner housing 21 passes over the associated wall sections 64a or 64b and onto the saw cylinder 45. Preferably, also, the lower edge portion of each of the wall sections 64a and 64b is made separate from the main portion of the wall section and is secured thereto, as by bolts 75. Adjustability may be provided by such means where necessary. A double spiral beater 77 is disposed in the opening 69 and is supported upon a shaft 78 which is carried in bearings 80 supported by the sidewalls of the cleaner housing 21, as best shown in Figures 3 and 4.

The lower portion of the chamber or compartment 67, defined by the front wall 61 of the cleaner housing and the intermediate wall means 64, is closed at its lower portion by a concave wall or trough 85 which terminates in an edge 86 lying closely adjacent to the periphery of the saw cylinder 45, as best shown in Figure 3. The lower wall section 85 is curved in substantially concentric relation with respect to a second drum 88 which is disposed adjacent the saw cylinder 45 and is carried upon a shaft 89 supported by bearing means 90 (Figure 2) carried by the cleaner housing 21. The drum 88 is provided with spiral ridges 91 of the form best shown in Figure 4 from which it will be noted that the ridges 91 are curved oppositely with respect to the spiral ridges 52 supported on the drum 48.

On the side of the main saw cylinder 45 opposite the second drum 88 and the trough or concave wall 85, a second trough or concave wall 100 is provided and which extends transversely the entire length of the cleaner housing 21, as best indicated in Figures 4 and 5. The forwardmost edge 101 of the second trough or concave 100 extends toward the peripheral portion of the saw cylinder 49 but is spaced away therefrom a distance which is somewhat greater than the spacing between the saw cylinder 45 and either the edge 70 or the edge 86 of the intermediate and front wall means described above, this being for a purpose which will be explained later. The rear or uppermost portion of the concave wall 100 terminates upwardly in a forwardly projecting horizontal section 104 which is substantially flat and which has an edge portion 105 which lies closely adjacent the peripheral surface of the saw cylinder 45. The major portion of the wall section 104 is flat and lies directly underneath the rotatable doffing brush 55 referred to above.

A screw conveyor 110 carried on a shaft 111 is disposed within the trough or concave 100 and includes right and left hand screw conveyor sections 112 and 113 separated by a central paddle section 114. The second trough 100 and its upper section 104 serve to define a third chamber or compartment 116, as will be referred to later, and, as best shown in Figure 3, each of the chambers or compartments 66, 67 and 116 have a portion of the periphery of the saw cylinder 45 disposed therein or communicating therewith.

A second screw conveyor 120 is disposed transversely in the cleaner housing 21 rearwardly and upwardly of the screw conveyor 110, as best shown in Figure 3, and the screw conveyor 120 consists of right and left hand sections 121 and 122 spaced apart at their laterally inner ends and mounted on a shaft 124 which carries a paddle section 125 between the laterally inner ends of the screw conveyor sections 121 and 122. The rear wall of the cleaner housing 21 includes curved sections 127 and 128 which conform to the diameter of the screw conveyor sections 121 and 122 and, like said sections, are spaced apart laterally to provide an opening 130 through which the material that is fed laterally inwardly by the screw conveyor sections 121 and 122 is discharged. An elevator 135 is carried at the rear of the machine and includes a receiving boot 136 disposed underneath the discharge opening 130 to receive the material therein. A flight elevator belt 138 is arranged to operate within the elevator 135, the belt 138 being carried over a sprocket 140 carried by a shaft 141 journaled in the lower section of the elevator, and the upper run of the elevator belt 138 moves upwardly over an imperforate bottom or wall section 143, as best shown in Figure 3. The flight elevator belt 138 includes paddles 144 which carry the cotton upwardly and discharge the same through a discharge hood 145 (Figure 1) into a wagon or other container drawn at the rear of the tractor.

Means is provided for the removal of material from the second compartment 67 to the third compartment 116, and for this purpose the end walls of the cleaner housing 21 are each provided with an opening 150 (Figure 3) at each end of and slightly above the second drum 88. The shaft 89 on which the drum 88 is mounted is provided with a pulley at each end thereof, and over these pulleys conveyor belts 152 and 153 are trained. The conveyor belts 152 and 153 extend rearwardly to a point adjacent the ends of the second trough or concave 100 and are trained at their rear portions over idler pulleys 156, one of which can be seen in dotted lines in Figure 3. These conveyor belts 152 and 153 are enclosed by auxiliary housings 154 and 155, and the rear ends 154a and 155a of these housings communicate with the ends of the trough or concave 100 and, receiving the laterally outer ends of the screw conveyor sections 112 and 113, actually serve as a part of the trough or concave member 100.

From Figure 3 it will be clear that at the lower portion of the cleaner housing 21 there is an open space between the edge 86 of the front trough 85 and the edge 101 of the rear trough 100 in which the screw conveyor 110 is disposed. Between the drum 88 and the screw conveyor 110 three brushes 160, 161 and 162 are provided, and these brushes are mounted on bell cranks 164, 165 and 166 having springs 167 connected thereto to yieldingly urge the brushes into contact with the lower portion of the saw cylinder 45. Each spring 167 is connected at its forward end to a bolt 168 extending through the transverse frame member 24. The forward end of each of the bolts is provided with a nut 169 by which the tension of the associated spring can be adjusted or the brushes may be lowered entirely out of contact with the saw cylinder 45.

Power for operating the cleaning mechanism is preferably obtained from the power take-off shaft on the tractor 3. To this end, the cleaning mechanism includes a main drive shaft 170 (Figure 1) which is connected through bevel gears 171 and a coupling 172 to a transverse jack shaft 173, as best shown in Figure 4. The jack shaft 173 extends laterally outwardly to the end of the cleaner housing 21 and is provided with a sprocket 175 over which a drive chain 176 is trained, as best shown in Figure 2. The jack shaft 173 is supported by suitable bearing means carried by the transverse frame member 24. The drive chain 176 is arranged to drive the first drum 48, the second drum 88, the screw conveyor 110 and the doffing brush 55 by suitable sprockets over which the chain 176 is trained and which are fixed, respectively, to the various shafts supporting these parts. To this end, the shaft 49 carries a sprocket 178, as best shown in Figure 2, and the shaft 89, to which the drum 88 is fixed, carries a relatively large sprocket 179. The doffing brush shaft 56 carries a sprocket 181 and the shaft 111 for the screw conveyor 110 carries a sprocket 182. An idler sprocket 183 is provided for maintaining the drive chain 176 at the proper tension. Preferably, the idler 183 is supported on an idler shaft 184, as best shown in Figure 2. The shaft 49 for the drum 48 also carries a second sprocket over which a chain 186 is trained, and this chain 186 passes over a sprocket 187 secured to the shaft 78 which carries the spiral beater 77 and over another sprocket 188 which is fixed to the shaft 58 which carries the smooth drum 57.

The saw cylinder 45 and the screw conveyor 120 are driven by any suitable means, preferably disposed on the opposite side of the cleaning mechanism from the driving means just described. At the opposite side of the cleaner housing 21, the shaft 111 carries a sprocket 190 over which a chain 191 is trained, and the latter is trained over a sprocket 192 fixed to the saw cylinder shaft 46 and over a third sprocket 194 fixed to the screw conveyor shaft 124. As best shown in Figure 2, the elevator 135 is driven by a chain 196 trained over a sprocket 197 fixed to the screw conveyor shaft 124 at the end opposite the sprocket 194, and the chain 196 is also trained over a sprocket 198 carried at the laterally outer end of the shaft 141 which supports the sprocket 140 which drives the flight elevator belt 138.

The operation of the structure so far described is substantially as follows. As the machine moves along the row or rows being stripped, the mechanism or mechanisms 2 remove both the green and ripe cotton bolls, together with a considerable quantity of foliage, twigs and the like, from the cotton plants. A substantial proportion of the foreign matter is removed from the stripped material as the latter is directed rearwardly by the preliminary cleaning and conveying means 4 and 5. The material is then directed from the discharge ends of the mechanisms 4 and 5 into the cleaner housing 21 through the openings 42 in the upper or top wall thereof. The material then moves downwardly along the intermediate wall sections 64a and 64b into the zone of its first contact with the teeth of the saw cylinder 45. The rotation of the latter, being in the direction of the arrows shown in Figures 3 and 4, carries the material up against the rotating drum 48, and the teeth on the saw cylinder 45 pick up the cotton lint and carry the same underneath the drum 48. Cotton clinging to the saw cylinder 45 and passing under the drum 48 is removed by the rapidly rotating doffing brush 55 and is directed rearwardly toward the screw conveyor 120. The rotation of the screw conveyor 120 feeds material laterally inwardly toward the central opening 130 from which the cotton is fed by the paddle 125 to the elevator 135, and the latter serves to discharge the stripped and cleaned cotton into the wagon 146.

The drum 48, which is rotating in the direction of the arrow in Figure 3, serves to keep unopened bolls and other material from passing along with the cotton and, by virtue of the spiral curvature of the ridges 52, feeds such remaining material from the laterally outer portions or ends of the cleaner housing toward the central portion thereof. For example, the material adjacent the left hand end of the housing 21 (looking forwardly in the direction of travel) is moved by the drum 48 in the direction of the arrow shown in Figure 5. The drum 57 is smooth and, rotating in the direction of the arrows shown in Figures 3 and 4, aids in preventing material from being carried over the top of the drum 48.

All of the material remaining in the first compartment 66 is thus gradually fed laterally inwardly toward the opening 69 in the intermediate wall means 64. The rotation of the spiral beater 77 then forces this remaining material into the second compartment 67 where it is again presented to the saw cylinder 45 at a different point on the periphery of the latter. As the material is fed into the compartment 67 by the rotation of the beater 77, the rotation of the second drum 88, which is in the direction of the arrows shown in Figures 3 and 4, carries the material toward the face of the saw cylinder 45 so that the teeth thereof will pick up cotton which remains in the material. The lower edge 70 of the wall means 64 serves to prevent any foreign matter from passing along with the cotton during the rotation of the saw cylinder 45. Material doffed by the lower edges 70 falls back upon the drum 88 and is again presented to the saw cylinder 45. Thus, in being conducted to the outer sides of the cleaner by the drum 88, the material is repeatedly presented to the saw cylinder 45, and the drum 88, therefore, forms means for presenting material to the saw cylinder at a point removed from the point at which it is initially presented to the cylinder.

The spiral ridges 91 on the drum 88, which are curved in a direction opposite with respect to the direction of curvature of the ridges 52, now urge the material from the central portion of the drum 88 toward the laterally outer ends thereof so that, where in the first instance the stripped material was fed laterally inwardly along the face of the cylinder 45 by the drum 48, the material remaining is now fed laterally outwardly by the second drum 88. By virtue of this means a substantial proportion of the cotton lint is picked out of the material by the saw cylinder 45. The cotton and unopened bolls and refuse not picked up by the saw cylinder from the material in the compartment 67 is fed out over the ends of the drum 88 through the openings 150 and into the auxiliary compartments 154 and 155 adjacent the forward ends thereof. This ejected material is then deposited onto the rearwardly moving conveyor belts 152 and 153 and conducted across the ends of the rotating saw cylinder 45 and deposited into the laterally outer ends of the second trough 100.

At this point the remaining material is fed laterally inwardly by screw conveyor 110 which serves to throw such remaining material against the rear side of the saw cylinder and simultaneously conduct it towards the center of the cleaner housing. A third presentation of the stripped material is thus made to the saw cylinder 45 and at a third point on the circumference thereof spaced from the points at which the material was first presented. Since the edge 101 of the second trough 100 is spaced an appreciable distance from the face of the saw cylinder 45, a certain amount of the foreign material is ejected by the operation of the screw conveyor sections over the entire length of the edge 101. The brushes 160, 161 and 162, however, serve to prevent such foreign material, and also any other foreign material clinging to the cotton on the saw cylinder 45, from passing around with the saw cylinder 45 beyond this point.

Reference was made above to the fact that the machine of the present invention can operate under conditions where all of the cotton crop is ripe and matured or under conditions where only a portion of the crop is ripened, with a certain percentage of the crop in green or immatured state. When operating under conditions in which all of the crop is ripened and the bolls open or ready to be opened, the larger sprockets 13 are employed so that the beaters 6 are driven at such rate that all of the unopened cotton bolls are opened during the preliminary cleaning and conveying operation. Under these conditions the brushes 160, 161 and 162 are disposed in the position shown in Figure 3, namely, up against the lower portion of the saw cylinder 45, the springs 167 being tightened to move the brushes to this position and to yieldingly hold them in such position. The stripped material, including the opened bolls and such amounts of foreign material as are passed along by the beaters 6, is then first presented to the saw cylinder in the compartment 66, the remaining material being shifted laterally into the second compartment 67 and again presented to the saw cylinder 45. Next, the material not picked up by the saw cylinder 45 is then transferred to the third compartment 116 and again presented to the saw cylinder 45, in the manner set forth above. Also the foreign matter remaining in the compartment 116 by the time the material reaches the central portion thereof has been ejected over the edge 101 of the trough 100, and the central paddle 114 serves to finally eject all of such foreign material and to prevent clogging at the point to which both the screw conveyor sections 112 and 113 direct material. The brushes 160, 161 and 162 also serve to remove foreign material clinging to the cotton on the drum 45 and to allow such material to drop downwardly through the space between the edge 86 on the forward trough 85 and the edge 101 on the rear trough 100. Where, under the conditions assumed, all of the crop consists of matured bolls, such foreign material can be allowed merely to drop to the ground.

When it is desired to separate out the green or immature bolls from the ripe or matured bolls, the brushes 160, 161, and 162 are lowered into their dotted line position (Figure 3). This leaves a space between the edge 101 of the wall 100 and the saw cylinder 45, and the residue material, including all unopened bolls, is forced over the edge 101 throughout substantially its entire length by the screw conveyor 110. Thus the latter acts to separate the unopened bolls from the ripe or matured cotton picked up by the saw cylinder 45. If the brushes 160, 161, and 162 were not lowered, the green bolls might be crowded through the brushes and broken open, which would result in some of the immature damp cotton being pulled out of the broken green bolls and carried upward by the saw cylinder 45, thereby mixing damp immatured cotton with the dry matured cotton and materially lowering the quality of the cotton. Where such separating means is employed, it is desirable to equip the machine with some form of hopper means to catch such unopened bolls. Preferably, in addition, such hopper or container is arranged to periodically discharge the contents thereof. Such hopper or container will now be described.

The hopper or container for receiving the material, including the green and immatured bolls which are separated from the ripened cotton when the brushes 160, 161 and 162 are lowered is indicated in its entirety in Figure 3 by the reference numeral 200 and comprises a stationary bottom 201 and stationary side walls 202 and 203 reenforced and supported from the longitudinal frame members 22 and 23 by suitable angle bars or the like. The container 200 is provided with a movable rear wall 204 which is pivotally connected to the cleaner housing 21 by hinge means 205 and is adapted to swing rearwardly to the open position indicated in dotted lines in Figure 3. The container 200 also includes a movable front wall 206 which is adapted to slide along the bottom of the container, from the position shown in full lines in Figure 3 to the position shown in dotted lines, for the purpose of emptying the container, suitable means being provided for forcing the slidable wall 206 rearwardly as will be described later. The front wall 206 is held in an upright position in its sliding movement by means of guide rods 208 and 209 which are fixedly secured to the wall 206 at their rear ends and are slidingly disposed in suitable openings in a pair of brackets 210 and 211, the bracket 210 being suitably secured, as by bolt means, to the longitudinal frame bar 22 while the other bracket 211 is secured to the other frame bar 23, as indicated in Figure 4.

The movable front and rear walls 204 and 206 are connected together by means which serves to hold the rear wall in closed position so long as the front wall 206 is in its forward position. However, such means does not interfere with the rearward swinging movement of the rear wall 204 when the front wall 206 is forced rearwardly to eject the contents of the container 200. Such interconnecting means serves to hold the rear wall 204 in a closed position and comprises a rod 212 at each side of the machine connected to a spring 213 which, in turn, is connected to a slide 214 slidingly mounted in guides 215 provided on the side of the wall 203. Each slide 214 has its front portion 216 bent laterally inwardly so as to be disposed in the path of movement of an outwardly bent portion 217 of a bracket 218 carried by the front movable wall 206, as best shown in Figure 3. When the front wall 206 is in the position shown in full lines in Figure 3, the portion 217 of the bracket 218 engages the portion 216 of the associated slide 214 to hold the latter in the position shown in Figure 2. In this position, the springs 213 are under tension and serve to yieldingly hold the rear movable wall 204 in its closed position. When the front wall 206 is moved rearwardly, the slides 214 are permitted to slide rearwardly, thereby releasing the tension on the springs 213, whereupon the rear wall 204 is then free to swing rearwardly into its dotted line position shown in Figure 3. The wall is swung to such position under the action of a spring 220 connected to the rear wall 204 and to some portion of the cleaner housing 201. The rearward swinging movement of the rear wall 204 is also aided by the pressure of the material being ejected.

Any suitable means for forcing the front wall 206 of the container 200 rearwardly may be provided, but in the preferred construction the means for forcing the wall 206 rearwardly is adapted to be operated by the power of the tractor. To this end, an intermittently operating clutch 230 is provided for moving the front wall 206 from the position shown in full lines in Figure 3 to its dotted line position and back again. This clutch mechanism is best shown in Figure 2, certain parts also being shown in Figures 4 and 5, and, as illustrated, the clutch is mounted on a short shaft 231 upon which a sprocket 232 is journaled for free rotation and is driven by a chain 233 trained thereover and over a sprocket 234 fixed to the shaft 46 upon which the main saw cylinder 45 is mounted.

The clutch mechanism proper comprises a constantly rotating notched member 235 fixed to rotate with the sprocket 232 and an intermittently operable plate member 236 preferably fixed to the shaft 231. The plate member 236 has an arm 237 pivoted thereon which carries a pin 238 projecting through a slot 239 in the plate member 236. On the inner side of the plate member 236, the pin 238 carries a roller which is adapted to engage in any one of the notches in the notched member 235 so as to cause the plate 236 to rotate with the member 235 whenever the roller is allowed to engage in one of said notches. A spring 240 is anchored to the plate member 236 and to the pin 238 and is tensioned to rotate the lever 237 to a position where the roller will engage one of the notches 235 whenever the lever 237 is permitted to swing about its pivotal support on the plate 236. Normally the lever 237 is held in the position shown in Figure 2, with the roller out of engagement with the notched member 235, by means of a member in the form of a roller 241 carried on the lower end of an arm 242 pivoted on a support projecting laterally from the side of the auxiliary housing 155. The opposite or upper end of the lever 242 is biased for movement to swing the roller 241 downwardly by means of a spring 244 connected with the upper end of the lever 242 and anchored to a bracket 245 carried by the cleaner housing 21. As long as the lever 242 is maintained in the position shown in Figure 2, the roller on the pin 238 is held out of engagement with the notches on the member 235 and the intermittently operating clutch 230 is held out of operation.

Suitable means is provided for swinging the lever 242 so as to release the roller on the pin 238 for setting the clutch in operation, and to this end the upper portion of the lever 242 is connected by means of a link 250 with an arm 253 fixed on a trip shaft 254, and the laterally inner end of this trip shaft 254 is bent to provide a trip lever 255. When the trip lever 255 is depressed, the roller 241 is raised out of contact with the lever 237, thereby permitting the latter to rotate to a position under the action of the spring 240 to cause the roller carried by the pin 238 to engage one of the notches on the member 235. The roller 241 then rides upon the outer circumference of the plate member 236 until the latter has made one revolution, at which time the roller will again engage the upper end of the lever 237 and will move it to a position to disengage the roller on the pin 238 from the notch in the member 235 in which it was disposed.

This rotation of the plate member 236 is made use of for moving the front wall 206 from one position to another. Suitable connections are made between the wall 206 and the rotatable plate member 236, and such connections comprise a pitman 260 pivotally connected, as at 261, to the plate member 236 and to an arm 262 fixed on a rock shaft 263 which, as best shown in Figures 4 and 5, extends transversely to the other side of the housing 21 and is supported by suitable bearings 265 (Figure 5) carried by the longitudinal frame bars 22 and 23. A pair of spaced L-shaped arms 267 and 268 are fixed to the rock shaft 263 adjacent the ends thereof and are connected by means of links 269 and 270 to the movable wall 206. Thus, whenever the clutch 230 is operated by stepping on or otherwise swinging the trip shaft 254, the plate member 236 is rotated through one revolution to swing the rock shaft 263 in one direction, thereby moving the wall 206 from one position to the other and then back again. The container 200 thus provides means for receiving the green bolls and other material discharged by the cleaning and separating mechanism, and by the proper operation of the intermittently operated clutch, such material can be periodically deposited. In the preferred operation of the machine, the operator on each trip across the field will empty the container 200 each time he comes opposite the part at which it was emptied on the previous trip, thus making a series of transverse windrows across the field. The foreign material and other refuse which is also collected and separated with the green bolls from the matured cotton will also be deposited, but this material can be separated from the cotton after the green bolls have ripened. For this operation, the material may be run through the machine the second time. When operating in cotton in which all of the bolls are matured, the container 200 may be removed.

While I have described above the preferred construction in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. In a cleaner of the class described, a housing, a saw cylinder in said housing, means for rotating said saw cylinder, means for directing material into said housing into contact with the side of said saw cylinder moving upwardly, means for moving said material laterally along said saw cylinder and beyond the ends thereof, said saw cylinder acting upon the material during such lateral movement to remove cotton therefrom, endless belt means at opposite ends of said saw cylinder driven from said last named means and arranged to receive the remainder of said material therefrom and to conduct the same to the opposite side of said saw cylinder, and means at the opposite side of said saw cylinder arranged to receive material from said endless belt means and to present the remainder of said material to said saw cylinder, whereby said saw cylinder acts upon the remainder of said material to further remove cotton therefrom.

2. In a cleaner of the class described, a housing divided into three compartments, a passage between the first and second compartment, a saw cylinder in said housing, different portions thereof being disposed in each of said compartments, means for directing material into the first compartment to one portion of said saw cylinder remote from the passage connecting the first and second compartments, means for moving said material laterally along said saw cylinder towards said passage, said saw cylinder acting upon the material during such lateral movement to remove cotton therefrom, means in said passage for receiving material from said material moving means for directing the material from the first compartment into the second compartment through the passage, means in said second compartment for presenting the remainder of the material to said saw cylinder and for simultaneously moving said remainder of the material laterally along said saw cylinder in the direction opposite to its movement in the first compartment, whereby said saw cylinder acts upon said remainder of the material to further remove cotton therefrom, a conveyor for receiving the residue of said material from said last means and for conveying it into said third compartment, and means in said third compartment for presenting the residue of said material to said saw cylinder, whereby said saw cylinder acts upon said residue to further remove cotton therefrom.

3. In a cleaner of the class described, a housing divided into three compartments, a saw cylinder in said housing, different portions thereof extending into said compartments, means for directing material into one of said compartments, means for moving said material laterally along said saw cylinder, said saw cylinder acting upon the material during such lateral movement to remove cotton therefrom, means for conducting the material remaining in said first compartment at the end of such lateral movement into said second compartment, means in said second compartment for presenting said remainder of the material to said saw cylinder and for simultaneously moving said material laterally along said saw cylinder in the direction opposite to its movement in the first compartment, whereby said saw cylinder acts upon said remainder of the material to further remove cotton therefrom, said housing having an opening in the bottom thereof between said second and third compartments, means in said third compartment for presenting material therein to said saw cylinder, and a plurality of brushes yieldingly held in contact with said saw cylinder in said opening to remove foreign matter adhering to the cotton removed from the refuse in said third compartment by said saw cylinder.

4. In a cleaner of the class described, a housing divided into a plurality of compartments, a saw cylinder in said housing, different portions thereof extending into said compartments, means for directing material into one of said compartments, means for moving said material laterally along said saw cylinder, said saw cylinder acting upon the material during such lateral movement to remove cotton therefrom, means for conducting the material remaining in said first compartment at the end of such lateral movement into another compartment, means in said other compartment for presenting said remainder of the material to said saw cylinder and for simultaneously moving said material laterally along said saw cylinder in the direction opposite to its movement in the first compartment, whereby said saw cylinder acts upon said remainder of the material to further remove cotton therefrom, said other compartment having a wall disposed along but spaced from said saw cylinder so as to accommodate the discharge of residue material from said other compartment over the edge of said wall, and a dumping container carried below the space between said wall and the saw cylinder to receive material discharged therethrough.

5. In a cleaner of the class described, a housing, a saw cylinder disposed in said housing, means for rotating said cylinder, means for directing material into said housing into contact with one side of said cylinder, means for moving said material laterally along said saw cylinder, the latter acting upon the material during such lateral movement to remove cotton therefrom, a conveyor extending substantially horizontally across one end of said cylinder to receive the remainder of said material after said lateral movement and arranged to conduct said remainder to the opposite side of said saw cylinder, connections for driving said conveyor from the means that rotates said saw cylinder, and means at said opposite side of said saw cylinder for presenting the remainder of said material to said saw cylinder, whereby said saw cylinder acts upon the remainder of said material to further remove cotton therefrom.

6. In a cleaner of the class described, a housing, a saw cylinder journaled for rotation in said housing, means for rotating said cylinder, means serving as a shield extending axially of the cylinder and having a central opening therein, means for directing material into said housing at the laterally outer ends thereof and over the laterally outer ends of said shield to said cylinder, means for moving said material laterally inwardly along said saw cylinder and along the shield, said saw cylinder acting upon the material during the lateral movement thereof in said direction to remove cotton therefrom, and means disposed below said shield and also extending axially with respect to said saw cylinder and adjacent the periphery thereof for receiving the material which passes through the central opening of the shield, said last named means being arranged to move said material along the periphery of said cylinder laterally outwardly and the portion of said shield adjacent the cylinder lying close enough to the periphery of the latter to prevent foreign matter from passing underneath the shield with the cotton on the cylinder.

7. In a cleaner of the class described, a housing, a saw cylinder journaled for rotation therein, means for rotating said saw cylinder, laterally spaced means for delivering material to said cylinder adjacent the ends thereof, a laterally extending shield disposed in said housing and extending axially along said cylinder and underneath said delivery means, said shield having an opening in the central portion thereof, a rotatable drum mounted in said housing adjacent said cylinder and spaced from said shield in the direction of travel of the saw cylinder, said drum being provided with spiral ridges arranged to shift the material from both ends of said saw cylinder toward the central portion thereof, said saw cylinder acting upon the material during such lateral movement to remove cotton therefrom and the portions of said material not passing along with the cotton picked up by said cylinder being discharged through the opening in the intermediate portion of said shield, and a second drum disposed underneath said shield and extending axially along the face of said saw cylinder, said last named drum being provided with spiral ridges for urging the material passing through the intermediate opening in said shield toward the face of said cylinder and laterally outwardly toward the ends of said saw cylinder.

8. In a cleaner of the class described, a housing, a saw cylinder journaled for rotation therein, means for rotating said saw cylinder, laterally spaced means for delivering material to said cylinder adjacent the ends thereof, a laterally extending shield disposed in said housing and extending axially along said cylinder and underneath said delivery means, said shield having an opening in the central portion thereof, a rotatable drum mounted in said housing adjacent said cylinder and spaced from said shield in the direction of travel of the saw cylinder, said drum being provided with spiral ridges arranged to shift material from both ends of said saw cylinder toward the central portion thereof, said saw cylinder acting upon the material during such lateral movement to remove cotton therefrom and the portions of said material not passing along with the cotton picked up by said cylinder being discharged through said opening in the intermediate portion of said shield, a beater element disposed in said opening in the intermediate portion of said shield for feeding material from the zone above said shield through said opening, and a second drum disposed underneath said shield and extending axially along the face of said saw cylinder, said last named drum being provided with spiral ridges for urging the material passing through the intermediate opening in said shield toward the face of said cylinder and laterally outwardly toward the ends of said saw cylinder.

9. In a cleaner of the class described, a housing, a saw cylinder journaled for rotation therein, means for rotating said cylinder, a laterally disposed inclined shield disposed in said housing with its lower edge lying adjacent the periphery of said saw cylinder and extending in an axial direction with respect thereto, a drum journaled for rotation in said housing in the same direction as said saw cylinder and spaced from said shield in the direction of rotation of the cylinder, means for delivering material into said housing into contact with said cylinder between said shield and said drum, the latter having spiral ridges for moving said material laterally along said saw cylinder and the latter acting upon the material during such lateral movement to remove cotton therefrom, said housing having a front wall disposed forwardly of said shield and terminating at its lower portion in a concave trough with an edge lying closely adjacent the periphery of said saw cylinder below the lower edge of said shield, a second drum disposed in said housing in said concave trough adjacent said saw cylinder and serving to receive the remainder of said material not passing over with the cotton on said cylinder, said second drum having spiral ridges for shifting the material laterally along said saw cylinder, the latter again acting upon the material during such lateral movement to further remove cotton therefrom, means serving as a second trough on the other side of said saw cylinder and having an edge lying adjacent to the periphery of said saw cylinder but spaced farther away therefrom than the edge of said shield and the edge of said first trough, means for delivering material from said second drum to said second trough, and means disposed in said trough and adjacent the periphery of said saw cylinder for urging said last named material toward said saw cylinder, the portions of said last named material not picked up by said saw cylinder being discharged over the edge of said second trough.

10. In a cleaner of the class described, a housing divided into three compartments, a passage between the first and second compartment, a saw cylinder in said housing, two of said compartments being on one side of said saw cylinder and the other compartment being on the other side, different portions of the saw cylinder being disposed in each of said compartments, means for directing material into the first compartment to one portion of said saw cylinder remote from the passage connecting the first and second compartments, means for directing said material laterally along said saw cylinder towards said passage, said saw cylinder acting upon the material during such lateral movement to remove cotton therefrom, means in said second compartment for presenting the remainder of the material entering the second compartment through said passage to said saw cylinder and for simultaneously moving said remainder of the material laterally along said saw cylinder in the direction opposite to its movement in the first compartment, whereby said saw cylinder acts upon said remainder of the material to further remove cotton therefrom, a conveyor driven from said last named means for receiving the residue of said material therefrom and for conveying it into said third compartment at the other side of the saw cylinder, and means in said third compartment for presenting the residue of said material to said saw cylinder, whereby said saw cylinder acts upon said residue to further remove cotton therefrom.

11. In a cleaner of the class described, a housing, a saw cylinder in said housing, spaced apart means for directing material into said housing substantially at the ends thereof and into contact with one side of said saw cylinder, means for distributing said material along said saw cylinder laterally inwardly from the points where said material is directed into the housing, means at the same side of the saw cylinder receiving the residue from said last named means and distributing the same laterally outwardly toward opposite ends of said saw cylinder, means within the housing for directing the remainder of said material not picked up by the cylinder into contact with the opposite side of said saw cylinder, and means at said opposite side of said saw cylinder for receiving said remainder from said last named directing means and arranged to separate the immature bolls in an unopened state from the cotton picked up by said saw cylinder from said remainder.

12. In a cleaner of the class described, a housing, a saw cylinder in said housing, spaced apart means for directing material into the end portions of said housing into contact with the ends of said saw cylinder, means for shifting the material laterally inwardly along the saw cylinder from the ends toward the central portion thereof, means receiving the residue of the material not picked up by the saw cylinder at the central part of the latter, means for feeding the residue laterally outwardly along the cylinder toward the ends thereof, means for conducting the remainder of said residue not picked up by the saw cylinder to the opposite side of the latter, and means for receiving said remainder and arranged to provide for the discharge of the green bolls at any point along the cylinder.

13. In a cleaner of the class described, a housing, a saw cylinder journaled for rotation therein, means for rotating said saw cylinder, laterally spaced means for delivering material to said cylinder adjacent the ends thereof, a laterally extending shield disposed in said housing and extending axially along said cylinder and underneath said delivery means, said shield having an opening in the central portion thereof, a rotatable drum mounted in said housing adjacent said cylinder and spaced from said shield in the direction of travel of the saw cylinder, said drum being provided with spiral ridges converging toward the center of the drum to shift the material from both ends of said saw cylinder toward the central portion thereof, said saw cylinder acting upon the material during such lateral movement to remove cotton therefrom and the portions of said material not passing along with the cotton picked up by said cylinder being discharged through the opening in the intermediate portion of said shield, a second drum disposed underneath said shield and extending axially along the face of said saw cylinder, said last named drum being provided with diverging spiral ridges for urging the material passing through the intermediate opening in said shield toward the face of said cylinder and laterally outwardly toward the ends of said saw cylinder, a trough disposed on the other side of the saw cylinder, means for directing the residue of said material from the ends of said second drum to said trough, and a rotatable member disposed in said trough for presenting said residue to said saw cylinder and for shifting said residue laterally inwardly toward the center of the trough and cylinder.

14. In a cleaner of the class described, a housing, a saw cylinder journaled for rotation therein, means for rotating said saw cylinder, laterally spaced means for delivering material to said cylinder adjacent the ends thereof, a laterally extending shield disposed in said housing and extending axially along said cylinder and underneath said delivery means, said shield having an opening in the central portion thereof, a rotatable drum mounted in said housing adjacent said cylinder and spaced from said shield in the direction of travel of the saw cylinder, said drum being provided with spiral ridges converging toward the center of the drum to shift the material from both ends of said saw cylinder toward the central portion thereof, said saw cylinder acting upon the material during such lateral movement to remove cotton therefrom and the portions of said material not passing along with the cotton picked up by said cylinder being discharged through the opening in the intermediate portion of said shield, a second drum disposed underneath said shield and extending axially along the face of said saw cylinder, said last named drum being provided with diverging spiral ridges for urging the material passing through the intermediate opening in said shield toward the face of said cylinder and laterally outwardly toward the ends of said saw cylinder, a trough disposed on the other side of the saw cylinder, means for directing the residue of said material from the ends of said second drum to said trough, a rotatable member disposed in said trough for presenting said residue to said saw cylinder and for shifting said residue laterally inwardly toward the center of the trough and cylinder, a wall above said rotatable member, a doffer drum mounted above said wall and operating to remove cotton from said saw cylinder, means receiving said cotton and conveying the same towards the center of the housing from both ends of said doffer drum and cylinder, and a centrally disposed discharge elevator carried by the housing and receiving the cotton from said conveying means.

15. In a cleaner of the class described, a housing, a saw cylinder journaled for rotation therein, means for rotating said saw cylinder, means for delivering material to said cylinder, a rotatable drum mounted in said housing adjacent said cylinder at one side thereof, said drum being provided with spiral ridges converging toward the center of the drum to shift the material from both ends of said saw cylinder toward the central portion thereof, a trough disposed on the other side of the saw cylinder, means for directing the residue of said material from said drum to said trough, a rotatable member disposed in said trough for presenting said residue to said saw cylinder and for shifting said residue longitudinally of the trough and cylinder, a wall above said rotatable member, a doffer drum mounted above said wall and operating to remove cotton from said saw cylinder, means receiving said cotton and conveying the same towards the center of the housing from both ends of said doffer drum and cylinder, and a centrally disposed discharge elevator carried by the housing and receiving the cotton from said conveying means.

16. In a cleaner, a housing, a saw cylinder in said housing, means for directing material into contact with one side of the saw cylinder where the peripheral travel of the saw teeth is in a generally upward direction, a portion thereof clinging to the saw cylinder, means for directing the remainder of said material into contact with the opposite side of the saw cylinder where the peripheral travel of the saw teeth is in a generally downward direction, there being an open space at the bottom of said cylinder between said two means so that unopened bolls can drop therethrough away from the cylinder, and a bin disposed under said space to catch the unopened bolls that drop through said space and to retain them in unopened state.

17. In a cleaner, a housing, a saw cylinder in said housing, means for directing material into contact with one side of the saw cylinder where the peripheral travel of the saw teeth is in a generally upward direction, a portion thereof clinging to the saw cylinder, means for directing the remainder of said material into contact with the opposite side of the saw cylinder where the peripheral travel of the saw teeth is in a generally downward direction, there being an open space at the bottom of said cylinder between said two means so that unopened bolls can drop therethrough away from the cylinder, brush means removably mounted in said open space and adapted in one position to engage said saw cylinder and brush waste matter off said cylinder and adapted in another position to be disengaged from said cylinder when a large number of unopened bolls are present, and a bin adapted to be disposed under said space to catch the unopened bolls that drop through said space and to retain them in unopened state.

18. In a cleaner of the class described, a housing, a saw cylinder journaled for rotation therein, means for rotating said saw cylinder, means for delivering material to one side of said cylinder, a rotatable drum mounted in said housing adjacent said cylinder at said one side thereof, said drum being provided with spiral ridges converging toward the center of the drum to shift the material from both ends of said saw cylinder toward the central portion thereof, a trough disposed on the other side of the saw cylinder, means for directing the residue of said material from said drum to said trough, a rotatable member disposed in said trough for presenting said residue to said saw cylinder and for shifting said residue longitudinally of the trough and cylinder, a wall above said rotatable member, and a doffer drum mounted above said wall and operating to remove cotton from said saw cylinder.

FRANK T. COURT.